Figure 1:
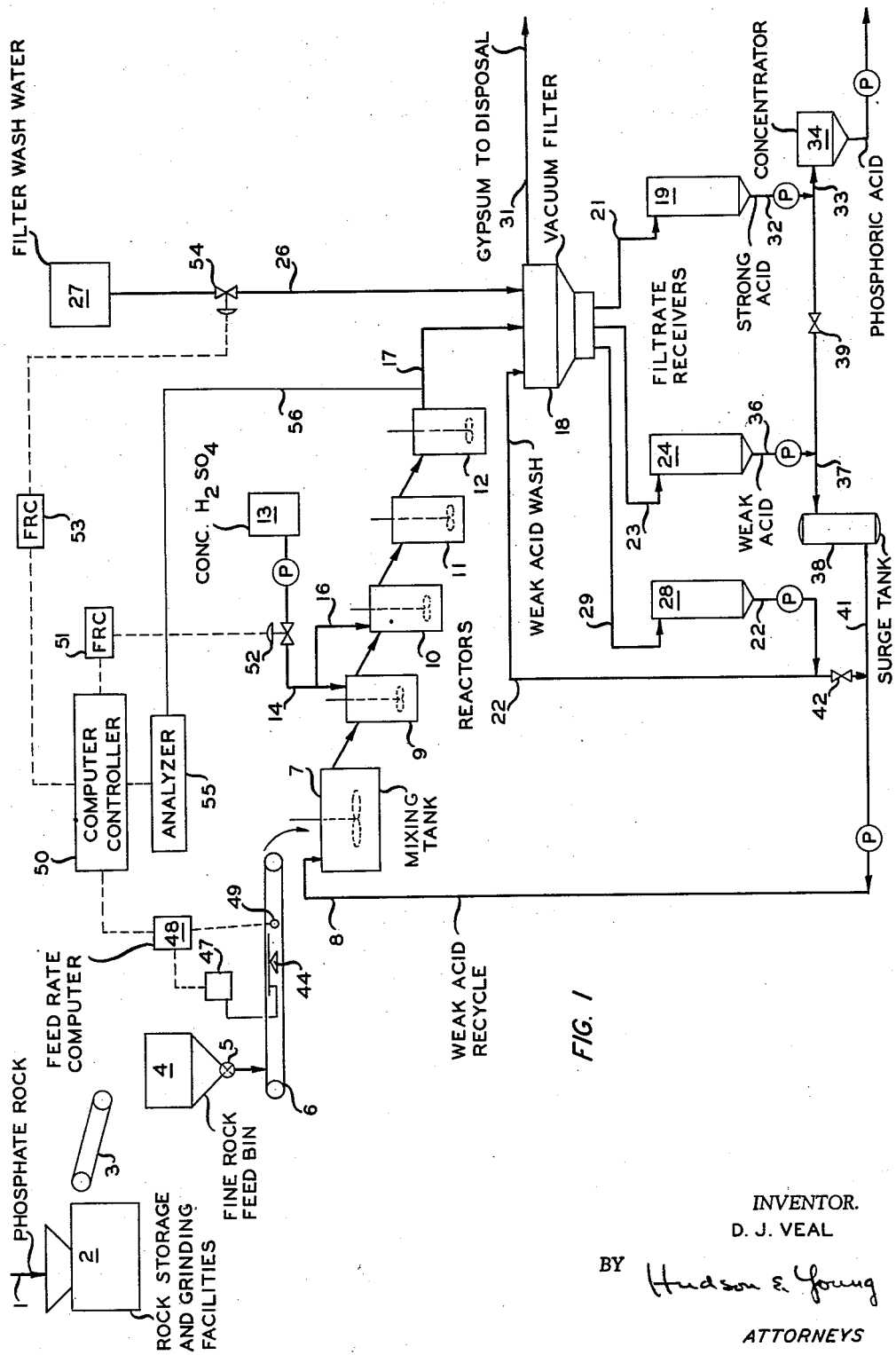

INVENTOR.
D. J. VEAL
BY Hudson E. Young
ATTORNEYS

INVENTOR.
D. J. VEAL

United States Patent Office  3,104,946
Patented Sept. 24, 1963

3,104,946
MANUFACTURE OF WET PROCESS
PHOSPHORIC ACID
Dean J. Veal, Bartlesville, Okla., assignor to Phillips Petroleum Company, a corporation of Delaware
Filed Dec. 28, 1959, Ser. No. 862,136
5 Claims. (Cl. 23—165)

This invention relates to the manufacture of wet process phosphoric acid. More particularly, it relates to a process and apparatus for automatically controlling the amount of free sulfuric acid in the production of phosphoric acid according to the wet process.

Many processes have been suggested, patented, or employed in the past for the manufacture of phosphoric acid. The so-called wet process for producing phosphoric acid has been extensively used because of its simplicity and economical operation. According to this process, phosphate rock is treated in a series of reactors with concentrated sulfuric acid to produce a slurry of dilute, soluble phosphoric acid and insoluble calcium sulfate (gypsum). The slurry is filtered and washed and the resulting dilute phosphoric acid filtrate product may then be concentrated for the production of triple superphosphate or other phosphatic fertilizer material. The insoluble calcium sulphate is usually reslurried with water and pumped to a spoil pond for disposal. It has recently been discovered that it is advantageous to initially react the phosphate rock with recycle weak phosphoric acid filtrate.

One of the most important variables which affects the reaction rate of the rock with the acid, the filterability of the reaction slurry, and the grade and physical properties of the phosphoric acid product, is the free sulfuric acid content in the wet process system. The percent free sulfuric acid is the percent of excess sulfuric acid above that required to react with all the phosphate rock. Although other process variables, such as rock particle size, reaction time, and temperature, are important, these can be fixed by plant design and experience. But it is the free sulfuric acid content in the system (which determines the acid-to-rock ratio) that is probably the most sensitive variable in the production of phosphoric acid by the wet process. If too little free sulfuric acid is present in the system, the filterability of the reaction slurry is affected because the reactors tend to produce a non-uniform filter feed slurry which is difficult to filter and which forms a filter cake that is difficult to wash to a low, water-soluble $P_2O_5$ content. A low sulfuric acid content causes the formation of very slimy, jelly-like impurities like silicic acid which get into the gypsum filter cake causing the same to blind and hinder effective filtration of the acid through the cake. Such a filter cake retains a small but economically significant amount of $P_2O_5$ and when the gypsum filter cake is discarded valuable amounts of available $P_2O_5$ are lost, thus affecting the economical operation of the process.

If the free sulfuric acid content in the system becomes too high, the amount of sulfuric acid in the filtrate product is correspondingly high and when this product is concentrated and used for reaction with phosphate rock in the production of triple superphosphate, the free sulfuric acid reacts with the rock to form calcium sulfate instead of triple superphosphate. This makes a low grade of triple superphosphate because the available $P_2O_5$ content of the triple superphosphate is lowered. Also, this high sulfuric acid content causes the triple superphosphate to become "sticky" and harder to handle. Another objection to the high sulfuric acid content in the system is that it increases corrosion in the system. Further, if the free sulfuric acid is allowed to become too high, the solubility of calcium sulfate is decreased to a point where the sulfuric acid will react with the larger particles of the phosphate rock feed before they are dissolved in the phosphoric acid. These particles become coated with calcium phosphate and this stops part of the rock from dissolving and reacting with the sulfuric acid. The reaction then stops using a large portion of the sulfuric acid that is being added and the free sulfuric acid becomes very high in the short period of time. Of course, the use of too much sulfuric acid in the process is wasteful in itself.

Figure 2:
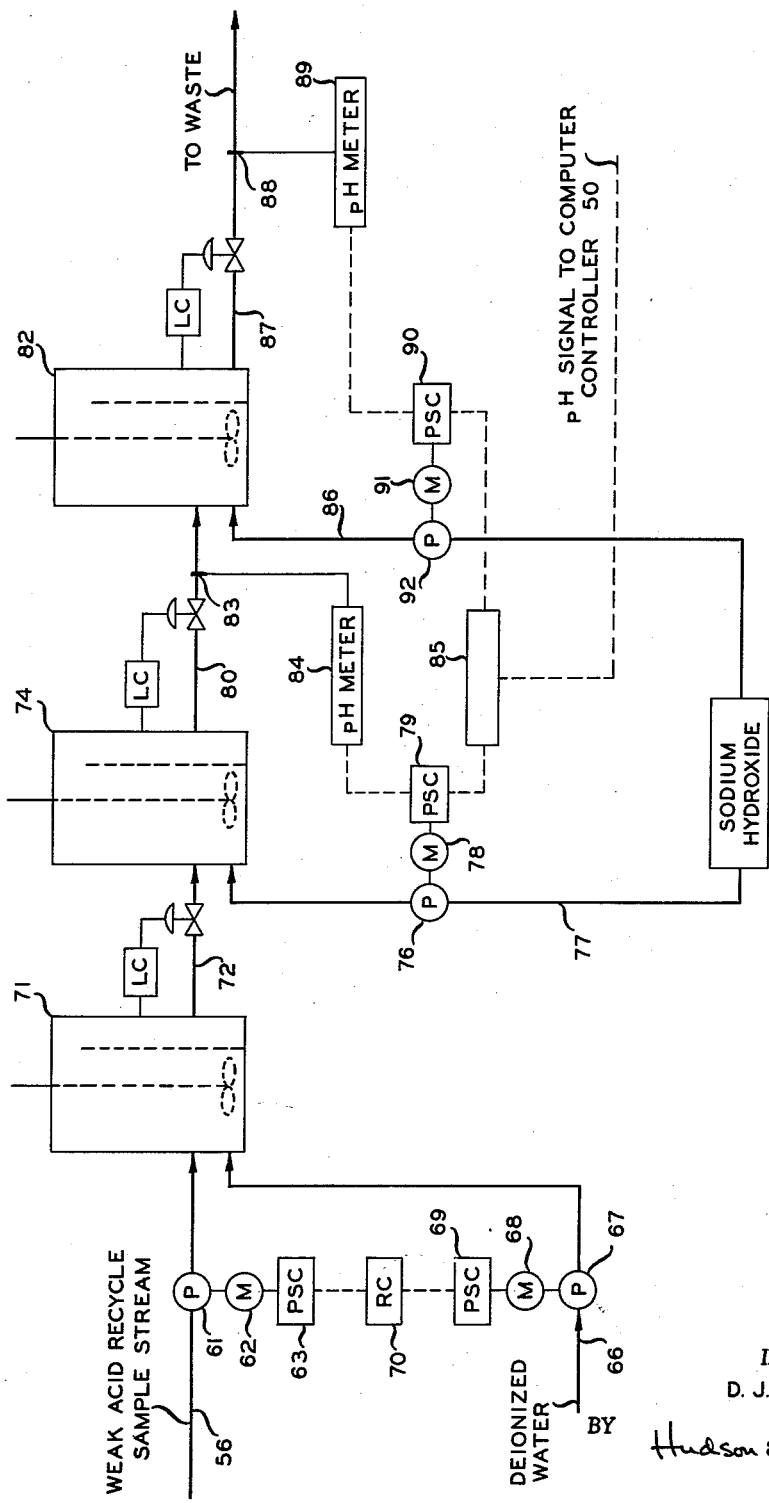
Figure 3:
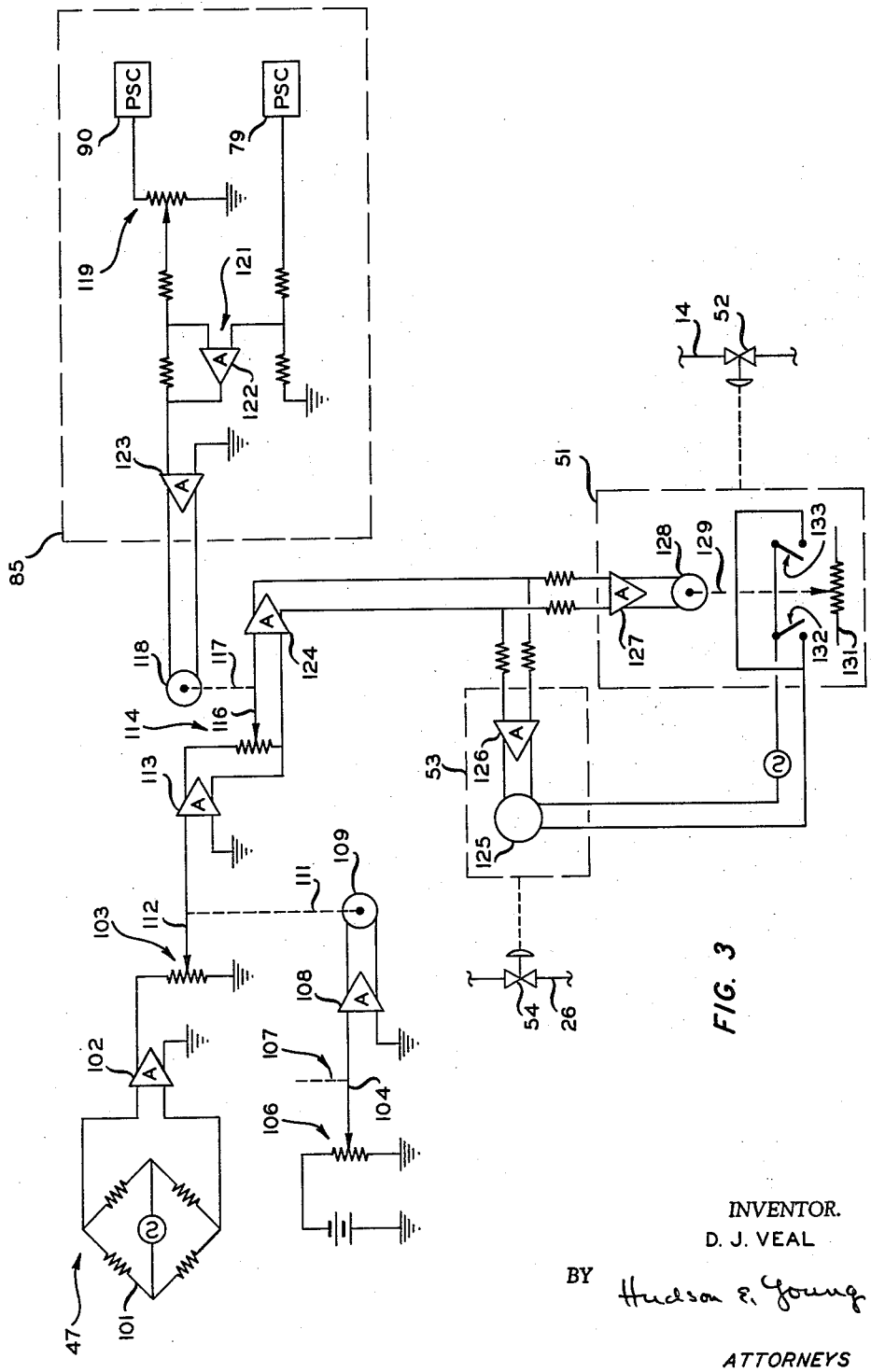

Accordingly, an object of this invention is to improve the manufacture of wet process phosphoric acid. Another object is to provide improved apparatus and process for automatically controlling the amount of free sulfuric acid in the production of phosphoric acid according to the wet process. Another object is to improve the reaction between phosphate rock and concentrated sulfuric acid in the production of phosphoric acid. Another object is to improve the filterability of the reaction slurry obtained by acidulating phosphate rock with concentrated sulfuric acid. Another object is to improve the recovery of available $P_2O_5$ in the production of phosphoric acid according to the wet process. Another object is to provide for the economical and efficient use of sulfuric acid in the production of phosphoric acid according to the wet process. Further objects and advantages of this invention will become apparent to those skilled in the art from the following discussion, appended claims, and accompanying drawing wherein:

FIGURE 1 diagrammatically represents a system for treating raw materials to produce the desired product according to the present invention;

FIGURE 2 diagrammatically represents a detailed portion of the analyzing system shown in FIGURE 1; and FIGURE 3 schematically illustrates an electrical system which can be used in the automatic operation of this invention.

By convention, the phosphoric content of any type of phosphatic fertilizer is expressed as phosphoric anhydride ($P_2O_5$). Most commonly, the term phosphoric acid is used to denote the $P_2O_5$ content. The difference between the total $P_2O_5$ content of the fertilizer and the fraction that is insoluble in ammonium citrate solution is the portion caused to be available for use of the plant and hence is termed available $P_2O_5$, or available phosphoric acid. In the fertilizer trade, it has long been the custom to express the quantity of phosphate rock in terms of $P_2O_5$ since tricalcium phosphate is seldom if ever found in phosphate rocks as such.

Referring now to the drawing, and to FIGURE 1 in particular, phosphate rock raw material is conveyed via line 1 to rock storage and grinding facilities 2. From the latter, finely divided phosphate rock is transferred by conveyer belt 3 to a fine rock feed bin 4 provided with a suitable rock feeder 5 at the low end thereof, such as a star valve. The fine rock drops onto a weigh belt 6 and is accurately weighed and conveyed at a constant rate to a mixing device 7, such as a tank or trough, where it is initially acidulated with weak phosphoric acid recycle conveyed via line 8. Mixing tank 7 is provided with a suitable motor-driven agitator so as to insure complete wetting of the rock with the recycle acid. This recycle acid, preferably having a specific gravity of about 1.2, serves to initially react with the rock, to furnish the water to the process necessary to dilute the phosphoric acid formed in reactors to a specific gravity of about 1.3, to form a gypsum slurry, and to provide water for evaporation to cool the reactors. For a given rock rate, the recycle rate of this acid is held constant; this rate controls the amount of solids in the last reactor, in which the solids content is preferably held at about 25 percent.

The wetted rock is allowed to flow after a few seconds into the first of a series of four reaction tanks or reactors 9, 10, 11, and 12, which are provided with suitable agitation means and are preferably enclosed and fabricated from carbon steel lined with rubber and acid-proof brick.

The wetted rock is mixed and partially reacted with concentrated sulfuric acid in the first reactor 9, the acid being supplied from storage tank 13 via line 14. The resulting mixture then overflows into the second reactor 10 where additional sulfuric acid is preferably added via line 16. The rock slurry mixture then overflows into third reactor 11 and then from there into the last reactor 12. Additional sulfuric acid can be added to reactors 11, 12, if necessary. The reactors are in series to provide sufficient retention time (e.g., 2 hours) for the reaction to go to completion and form phosphoric acid and gypsum. Obviously, I do not intend to limit my invention to the use of four reactors but instead to broadly include the use of any one or more, though I prefer the four as shown.

The reaction between sulfuric acid and phosphate rock is exothermic and considerable quantities of heat are liberated by this reaction, as well as from the dilution of concentrated sulfuric acid, the latter being initially diluted by the recycle phosphoric acid, for example, to a concentration of about 93 percent. The reactors will generally be operated at a temperature in the range of 165 to 190° F., but for the production of phosphoric acid having a maximum $P_2O_5$ content of 28 percent, a temperature of 170 to 175° F. is preferred. The fumes and steam evolved from the reaction can be carried by suitable means to fume scrubbers, and the like.

The slurry of soluble phosphoric acid and insoluble calcium sulphate (gypsum) is discharged from the last reactor 12 via filter line 17. About two-thirds of the phosphoric acid, $P_2O_5$, in the last reactor 12 comes from the recycle acid and about one-third is produced in the reaction of the phosphate rock. There are also various impurities dissolved in the phosphoric acid, such as the phosphates of iron and aluminum, various fluorides and silica compounds. The filter feed is discharged from line 17 onto one or more filters 18. In the interest of simplicity and to avoid prolixity, only one filter is shown and is preferably a horizontal vacuum filter of the Oliver type. It is to be understood and I do not intend to limit the practice of my invention to any particular type of vacuum filter. Although I prefer to employ a plurality of vacuum filters, e.g., three, actually one filter could be used if the filtrate pumps are large enough to handle all of the filtrate from the slurry.

The filter feed is fed over the surface of a filter cloth on what is called the strong filtrate section of the filter. Here as much of the undiluted phosphoric acid as possible is pulled from the deposited gypsum filter cake by a vacuum. The filtrate obtained, known as the "strong acid filtrate," or acid product, passes through the filter cloth and flows into a filtrate receiver 19 via line 21. This filtrate, a product of the process, preferably has a specific gravity of about 1.30. Generally, only a major portion of the strong acid, e.g., 70 percent, will be pulled through the filter cake, the minor portion remaining in the filter cake as residual strong acid. During the next filtration step the residual strong acid is recovered by washing the filter cake with "weak wash filtrate" supplied via line 22. The filtrate thus obtained, known as the "first weak acid filtrate" is drained through line 23 to a second filtrate receiver 24. By this second filtration step, most of the residual strong acid is recovered; however, usually about one-third of the residual strong acid will still be retained by the filter cake and must be recovered. Accordingly, the filter cake is then washed with relatively hot water, e.g., 170° F., to displace any residual acid remaining in the cake after the first washing step; filter wash water is conveyed via line 26 from supply 27. The filtrate obtained, known as the "second weak acid filtrate," is drained into the third filtrate receiver 28 via line 29. A portion or all of this last filtrate is pumped back through line 22 for use in the first washing as described above. The specific gravity of this filtrate is preferably in the range of 1.05 to 1.08. After the water washing step, the filter cake is removed with a blade that cuts off the top portion of the filter cake, which is then sent to a spoil pond via line 31.

The strong acid product in receiver 19 is pumped via line 32, 33 to suitable phosphoric acid concentration means 34 where the strong acid filtrate product can be concentrated, for example to 49.2 percent $P_2O_5$. The first weak acid filtrate in receiver 24 is pumped via lines 36, 37 to a recycle storage or surge tank 38 from which the acid is recycled via line 8 to the mixing tank 7. When necessary, some of the first weak acid filtrate can be conveyed from line 36 to line 33 by opening valve 39, and some of the second weak acid filtrate can be conveyed from the filtrate receiver 28 via line 41 to the weak acid recycle line 8 by opening valve 42.

As explained hereinbefore, it is desired to automatically control the amount of free sulfuric acid in the system according to this invention. Broadly, this is accomplished by controlling the acid-to-rock ratio by automatically adding the concentrated sulfuric acid after correcting for the amount of free sulfuric acid in the recycled phosphoric acid stream.

This is accomplished according to one preferred embodiment of this invention in the following manner. Referring to FIGURE 1, the weight of rock added to mixing tank 7 is determined by the product of signals representing weight per unit length of the weigh belt 6 and the speed of the weigh belt. A section of the weigh belt 6 is suspended so that equal lengths of the loaded belt and return belt are balanced on opposite sides of a fulcrum 44. The position of the fulcrum 44 determines the voltage drop across a strain gage in a weighing device 47. The signal from the latter is conveyed to a feed rate instrument 48, such as a multiplying circuit or totalizer. The speed of weigh belt 6 is determined by belt speed indicator 49 and this also sends a signal to the feed rate instrument 48. With no load on the weight belt 6 the system is in balance. As the load on the weigh belt 6 approaches the desired rate, a signal representing weight per unit length of the belt is conveyed to the feed rate instrument 48 along with a signal proportional to the belt speed. These signals are multiplied in feed rate instrument 38 and the product proportional to the rock feed rate is sent to a computer controller 50 where it will be electrically multiplied by a signal representing the free sulfuric acid content of the system. This computer controller 50 is connected to a flow recorder controller 51 which in turn is operatively connected to a flow control valve 52 in the concentrated sulfuric acid line 14, controlling the operation thereof. The computer controller 50 is also operatively connected to a flow recorder controller 53 which in turn operatively is connected to a flow control valve 54 in the filter wash water line 26, controlling the operation thereof. The computer controller 50 is also operatively connected to an analyzer 55 which is operatively connected by a small sample line 56 to the filter feed line 17. Alternatively, the analyzer 55 can be operatively connected to analyze the free sulfuric acid content in recycle line 8, or product line 32, or any other convenient point in the system. Analyzer 55 is adapted to continuously analyze the free sulfuric acid content, expressed as percent $SO_3$ in the system. The computer controller 50 is operatively adapted to control the amount of concentrated sulfuric acid feed conveyed in line 14 and the amount of filter wash water conveyed in line 26 in such a manner as to maintain the free acid content in the system within predetermined limits.

In the practice of this invention, it is preferred that the $SO_3$ content of the slurry be maintained within the range of about 0.5 to 3.5 percent $SO_3$, preferably within the range of about 2.0 and 2.5 percent $SO_3$. For example, when the free sulfuric acid content of the slurry is just slightly above the narrower desired range, e.g., 2.6 percent $SO_3$, the concentrated sulfuric acid feed rate will be diminished by a signal from the computer controller 50 by a suitable increment, e.g., 0.2 ton/hr., until the desired percent $SO_3$ is obtained again, after which the rate of sulfuric acid feed will be adjusted again to its normal rate. Operation in this manner insures the correct amount of sulfuric acid being continuously added within the predetermined limits.

Should the analysis of the slurry show that the percent $SO_3$ is above the broader desired range, e.g., greater than 3.5 percent $SO_3$, the computer controller 50 accordingly sends a signal to the filter wash water stream control valve 54 and correspondingly increases the flow of wash water sent to the filter 18, thus causing dilution of the second weak acid filtrate conveyed from recycle tank 38. At the same time, the computer controller 50 sends a larger signal to the flow control valve 52 in the sulfuric acid feed line 14 so as to further decrease the amount of sulfuric acid sent to the reactors by a suitable increment, e.g., 0.4 ton/hr. When the $SO_3$ content of the slurry returns to the narrower desired range, the computer controller 50 accordingly controls the concentrated acid flow control valve 52 to restore the normal addition rates. As the $SO_3$ content of the slurry falls, the control valve 54 on the filter wash water line 26 will be reset in increments, e.g., 5 tons/hr., until the normal wash rate on the filter 18 has been restored.

If a severe upset occurs resulting in a low $SO_3$ content in the slurry, for example, below about 0.5 weight percent, which might be caused by the rock having a high $P_2O_5$ content, the rock addition system operating on the high side, and the high filter wash rate, all occurring simultaneously, control of the free sulfuric acid is again dictated. This condition should be adjusted by the proper addition of make up acid as controlled by computer controller 50, valve 52 being opened to the desired extent. A suitable siren can be actuated by controller 50 when this condition occurs to make the operator aware of the low $SO_3$. The operator can then adjust some of the difficulty manually by diverting the first weak acid filtrate in line 36 to the concentrator 34 by opening valve 39. Alternativley, this diversion can be also automatically controlled by operatively connecting valve 39 to controller 50.

Although any suitable analyzer can be used for analyzing the percent $SO_3$ content of the slurry, the analyzing system illustrated in FIGURE 2 is a preferred embodiment.

The analyzing system of FIGURE 2 automatically measures the amount of unreacted sulfuric acid present in the filter slurry feed. At a 10:1 ratio of phosphoric acid to sulfuric acid, the difference in the second ionization constants of the two acids is great enough to permit differential titration for the determination of both acids. Titration to a pH of 4.8 measures the sulfuric acid content plus one-third of the phosphoric acid content. Titration to a pH of 9.0 measures the sulfuric acid content plus two-thirds of the phosphoric acid content. Subtraction of one-half of the second titration from the first gives amount of sulfuric acid present in the mixture. The sample stream 56 of the slurry feed 17 is diluted and then neutralized with a standard base, sodium hydroxide, and the neutralized stream has its two pH's measured by a pair of antimony or glass electrodes located downstream from the standard base inlets by means of two A.C.-operated pH meters.

Referring now to FIGURE 2 in detail, a sample stream of the slurry flowing in line 17 is diverted by way of line 56 to a suitable bellows pump 61 having a variable speed motor 62 and a pump speed controller 63 connected thereto. Deionized water is pumped via line 66 by means of pump 67 having a variable speed motor 68 and pump speed controller 69 connected thereto. This deionized water is pumped via line 66 to a vessel 71 where it is mixed with the sample slurry stream entering by way of line 56. A ratio controller 70 actuated by pump speed controller 63 and pump speed controller 69 maintains a ratio of 99 to 1 between the flow of deionized water in line 66 to the flow of slurry in line 56 respectively. Mixture in vessel 71 passes by way of line 72 and a control valve to a second mixing vessel 74. Sodium hydroxide having a normality of about 0.1 equivalent per liter is introduced to mixing vessel 74 by means of pump 76 through line 77. Pump 76 is equipped with a variable speed motor 78 and pump speed controller 79. The mixture from vessel 74 flows by way of line 80 into a third vessel 82. Mixture in line 80 contacts electrode 83, setting up a pH cell, the pH of which is determined by pH meter 84. Signals from pH meter 84 control the speed of motor 78 and thus the rate of addition of sodium hydroxide to vessel 74. This system is adjusted to maintain the pH at the electrode 83 at 4.8±0.05. The pump speed controller 79 also transmits a signal to an electrical subtracting circuit 85. The mixture in vessel 82 is mixed with additional sodium hydroxide introduced via line 86. The mixture from this vessel 82 flows via line 87 to waste; it also passes through a pH cell containing electrodes 88 whose signal operates pH meter 89 which transmits an electrical signal to pump controller 90 on motor 91 thereby controlling the rate of flow of sodium hydroxide to vessel 82. This system is adjusted so that the pH of the material passing through the second pH cell has a value of 9.0±0.05. The signal from the pump speed controller 90 is also sent to subtracting circuit 85.

Referring now to the electrical diagram of FIGURE 3, an automatic control system which can be used in this invention is illustrated. The voltage drop across bridge 101 of weighing device 47 is amplified by amplifier 102 and the output therefrom applied across potentiometer 103. The contactor 104 of potentiometer 106 is moved by the mechanical linkage 107 of belt speed indicator 49, and the potential picked off by contactor 104 is amplified by amplifier 108. The amplified signal from amplifier 108 drives servo motor 109 which causes mechanical linkage 111 to move contactor 112 of potentiometer 103. This results in the multiplication of the weight of rock per unit length of belt 6 times the speed of the belt in feet per unit length of time, the product being the feed rate of the rock per unit length of time. The feed rate signal is amplified by amplifier 113 and the amplified signal applied to potentiometer 114, the contactor 116 of which is moved by mechanical linkage 117 driven by servo motor 118, which in turn is driven in proportion to the determined free sulfuric acid content of the slurry.

The latter determination is made by electrically dividing the signal from pump speed controller 90 by two and subtracting the quotient from the signal from pump speed controller 79. This is shown in FIGURE 3, where the signal from pump speed controller 90 is divided by two by potentiometer 119. The reduced signal is subtracted from the signal from pump speed controller 79 in a subtracting circuit 121 having an amplifier 122. The amplified signal is amplified by servo amplifier 123, the servo motor 118 moving mechanical linkage 117, as described above.

The product of the rock feed rate and free sulfuric acid content is amplified by amplifier 124 and fed to servo amplifier 126 of flow recorder controller 53 and to servo amplifier 127 of flow recorder controller 51. The amplified signal from amplifier 127 drives the servo motor 128 in flow recorder controller 51. The contactor 129 is driven by servo motor 128 across slide wire 131 of controller 51. When contactor 129 moves to the extreme left, it closes switch 132, the position of contactor 129 on slide wire 131 being representative of a free acid content of 2.6%; when switch 132 is closed, closed, the acid flow control valve 52 is closed down to a lower pre-set value and wash water flow control valve 54 is reset to its normal position, due to preset limit stops in controller 53. When contactor 129 moves to the extreme right, it closes switch 133, the position of contactor 129 on the slide wire 131 being representative of a free acid content of 3.6%; when switch 133 is closed, the acid flow control valve 52 is closed down further and wash water flow control valve 54 is opened further to a position greater than its normal position.

The electrical system described above and illustrated in the drawing has been briefly set forth in the interest of brevity, the various potentiometers, amplifiers, multiplying and subtracting circuits, flow recorder controllers, and other components being well known in the art and commercially available.

To further illustrate the object and advantages of this invention, reference will now be made to the following example. However, it should be understood that the various rates, measurements, and other data in this example are merely representative of a preferred embodiment of this invention and should not be construed so as to unduly limit the invention.

EXAMPLE

Finely ground (70–80 percent through 200-mesh screen) phosphate rock, having the analyses set forth in Table I, is transferred at a rate of 17.6 tons/hr. (6.36 tons/hr. of $P_2O_5$ content) from the grinding and storage facilities 2 by way of belt 3 to the fine rock feed bin 4. The fine rock is conveyed by weigh belt 6 to the mixing tank 7 at a desired rate of 19.5 tons/hr. The feed rate instrument 48 determines the feed rate of the fine rock within the limits of ±1 percent or about ±400 lbs. of fine rock; this is equivalent to about 130 lb./hr. of $P_2O_5$ content in the rock and would require about 337 lb./hr. of sulfuric acid for conversion. The signal from the feed rate instrument 48, which is proportional to the rock feed rate, is sent to the computer controller 50.

Table I
TYPICAL ANALYSIS OF PHOSPHATE ROCK

| Ingredient | Weight Percent | T./Hr. |
|---|---|---|
| $P_2O_5$ | 32.56 | 6.36 |
| F | 3.59 | 0.70 |
| Combined water | 57.49 | 11.20 |
| Free water | 2.87 | 0.56 |
| Non-reactive | 3.49 | 0.68 |
| Total | 100.00 | 19.50 |

Recycled phosphoric acid containing approximately 17.04 tons/hr. of $P_2O_5$ is pumped at a rate of approximately 260 gal./min. (81.56 tons/hr.) through line 8 to the mixing tank 7. The capacity of the mixing tank 7 is 1700 gals. and with a flow rate of approximately 101 tons/hr., the retention time in the mixing tank is approximately 5 to 6 minutes. On the basis of 81.56 tons/hr. of recycle phosphoric acid, 0.5 percent $SO_3$ content represents about 800 lbs. of $SO_3$ and 0.25 percent or one-half the desired range of 2.0 to 2.5 percent $SO_3$ would be equivalent to about 400 lb. $SO_3$, which will be noted to be about the same order of magnitude as the control of the rock. A typical analysis of the recycle phosphoric acid is set forth in Table II.

Table II
TYPICAL ANALYSIS OF RECYCLE ACID

| Ingredient | Weight Percent | T./Hr. |
|---|---|---|
| $P_2O_5$ | 20.92 | 17.04 |
| $SO_3$ | 2.61 | 2.13 |
| F | 1.21 | 0.99 |
| Combined water | 11.14 | 9.09 |
| Free water | 64.12 | 52.31 |
| Total | 100.00 | 81.56 |

The wetted rock overflows from mixing tank 7 to the series of reactors 9, 10, 11, and 12. The capacity of each of these reactors is 9790 gals. which fixes the total reaction time within the range of 2 hours to about 2 hours, 20 minutes. This is approximately 30 to 35 minutes in each reactor.

Table III is a material balance for a plant when operating under the following conditions: fine rock 70–80 percent through 200-mesh screen, reaction time approximately 2 hours, temperature 160–190° F., mostly within the range 170–180° F., and 2.0 to 2.5 weight percent $SO_3$ content in the recycle acid.

Table III

| Stream | Charge to process, T./hr. | Stream | Effluent from process, tons/hr. |
|---|---|---|---|
| Fine rock | 19.50 | Fumes from reaction | 61.21 |
| Recycle acid | 81.56 | Net dilute acid | 22.22 |
| Sulfuric acid | 16.39 | Recycle acid | 81.56 |
| Cooling air | 54.85 | Gypsum slurry | 92.01 |
| Filter wash water | 29.02 | | |
| Gypsum dilution water | 55.68 | | |
| Total | 257.00 | Total | 257.00 |

Referring to Table II, it will be noted that the $SO_3$ is 2.61 weight percent. When such an analysis is obtained and the $SO_3$ content is between 2.50 and 2.75, the sulfuric acid rate will be diminished by a signal from the computer controller 50 by an increment of 0.2 ton/hr. (400 lbs./hr.) until an analysis between 2.0 and 2.5 percent $SO_3$ is again obtained, whence the rate will be adjusted again to the normal rate of 16.4 tons/hr. of sulfuric acid. Should the analysis of the slurry show that more than 3.5 weight percent $SO_3$ is present, the computer controller 50 accordingly sends a signal to the filter wash water valve 54 which results in an increase in the flow of wash water from approximately 29 tons/hr. to approximately 43 tons/hr. and approximately 13.5 tons/hr. of recycle filter wash water from line 26 will be mixed with the recycle acid flowing through line 8. This will immediately adjust the $SO_3$ content to the correct range, and prevent deposit of gypsum on the fine rock surfaces. At the same time, the sulfuric acid feed rate is decreased by 0.4 ton/hr. When the $SO_3$ content returns to the range of 2.0 to 2.5 weight percent, the sulfuric acid feed will be raised in two increments of 0.2 ton/hr. to restore the normal addition rate. As the $SO_3$ content of the slurry falls, the filter wash water control valve 54 will be reset in increments of approximately 5 tons/hr. until the normal water rate on the filter 18 has been restored.

Various modifications and alterations of this invention will become apparent to those skilled in the art from the foregoing discussion and accompanying drawing, and it should be understood that the subject invention is not to be unduly limited thereto.

I claim:

1. In the process for the production of phosphoric acid according to the wet process wherein a feed of phosphatic material and sulfuric acid are controlled, said process including the steps of initially reacting phosphatic material with recycled weak phosphoric acid, reacting the resulting mass with concentrated sulfuric acid to obtain a slurry of phosphoric acid and gypsum, filtering said slurry in a filtration zone to obtain a strong acid filtrate comprising strong phosphoric acid and a remaining mass comprising gypsum, washing the remaining gypsum mass with a wash medium to obtain a first weak filtrate, washing the now remaining mass with water to obtain a second weak acid filtrate, using said second weak acid filtrate as said wash medium, and recycling weak filtrate for use as said recycled weak phosphoric acid, the improvement comprising analyzing the free sulfuric acid content in a stream resulting in the process and containing free sulfuric acid by diluting a portion of said stream with water, subsequently neutralizing the resulting diluted portion with standard sodium hydroxide base to a pH of about 4.8 and then to a pH of about 9, correlating the difference in the amounts of said base used in the neutralizations to obtain an index of the free sulfuric acid content of said stream, and regulating, as required, the amount of said concentrated sulfuric acid being reacted with said phosphatic material and recycled weak phosphoric acid mass and the amount of the wash water, as required, in accordance with the determined free sulfuric acid content so as to maintain the desired amount of free sulfuric acid in the recycled weak phosphoric acid.

2. The process according to claim 1 wherein said slurry is continuously analyzed for said free sulfuric acid content.

3. The process according to claim 1 wherein said recycled weak phosphoric acid is continuously analyzed for said free sulfuric acid content.

4. The process according to claim 1 wherein said free sulfuric acid content is maintained within the range of 0.5 and 3.5 percent.

5. The process according to claim 1 wherein said free sulfuric acid content is maintained within the range of 2 and 2.5 percent.

References Cited in the file of this patent
UNITED STATES PATENTS

| | | |
|---|---|---|
| 1,940,689 | Moore | Dec. 26, 1933 |
| 2,710,247 | Knowles | June 7, 1955 |
| 2,887,362 | Lee | May 19, 1959 |
| 2,953,440 | Claudy | Sept. 20, 1960 |